April 29, 1941.  C. C. HALL  2,239,913
SEPARATOR AND BLOWER FOR INSULATING MATERIALS
Filed March 24, 1939  2 Sheets-Sheet 1

INVENTOR
C. C. Hall
BY
ATTORNEY

April 29, 1941. C. C. HALL 2,239,913
SEPARATOR AND BLOWER FOR INSULATING MATERIALS
Filed March 24, 1939 2 Sheets-Sheet 2

INVENTOR
C. C. Hall
BY
ATTORNEY

Patented Apr. 29, 1941

2,239,913

UNITED STATES PATENT OFFICE 2,239,913

SEPARATOR AND BLOWER FOR INSULATING MATERIALS

Carl C. Hall, Woodland, Calif.

Application March 24, 1939, Serial No. 264,043

1 Claim. (Cl. 302—37)

This invention relates in general to apparatus employed in connection with the building insulation art and in particular the invention is directed to apparatus for use with insulating material which is capable of being carried from a point outside the building and discharged into the building by means of an air blast created by a blower assembly and thereafter conveyed in a tube system.

One type of insulating material which is capable of placement in a building by the air blast method is red wood bark, for this material is now being used extensively due to the fact that it is inexpensive and yet relatively high in insulating characteristics. The bark is initially ground, cut or stripped into small fragments and is then compressed into a bale for ease of transportation. However, before such material can be placed in a building, it is necessary that the compressed mass be loosened or "fluffed."

Heretofore it has been the practice to accomplish this fluffing by hand and this entailed a substantial labor cost as well as unnecessary consumption of time.

It is therefore the principal object of my invention to provide a power driven apparatus, including a blower assembly, into which the compressed material is fed; the blower assembly being designed to separate the individual pieces of bark, or, in other words, to fluff the mass and discharge the same with an air blast into the tube or conduit system leading from the blower assembly to the point of discharge in the building.

A further object of this invention is to provide a blower assembly for the purpose described which includes a unique form of fan or impeller arranged in novel combination with a feed chute or material intake passage.

It is also an object of the invention to provide apparatus of the type described which is readily portable and can thus be conveniently moved from job to job.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Referring now more particularly to the characters of reference on the drawings, the apparatus comprises a portable rectangular frame structure 1, which may be mounted on wheels for convenience of transportation.

Mounted on the frame structure at one end is a blower housing 2, disposed with its axis extending lengthwise of the apparatus and formed with a laterally projecting discharge passage 3 at the bottom.

Figure 1:
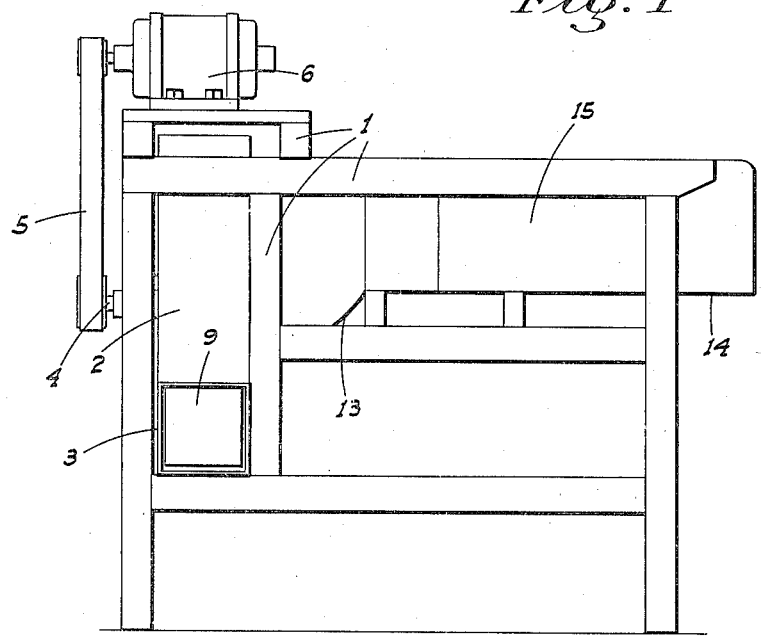
Figure 1 is a side elevation of the apparatus.
Figure 2:
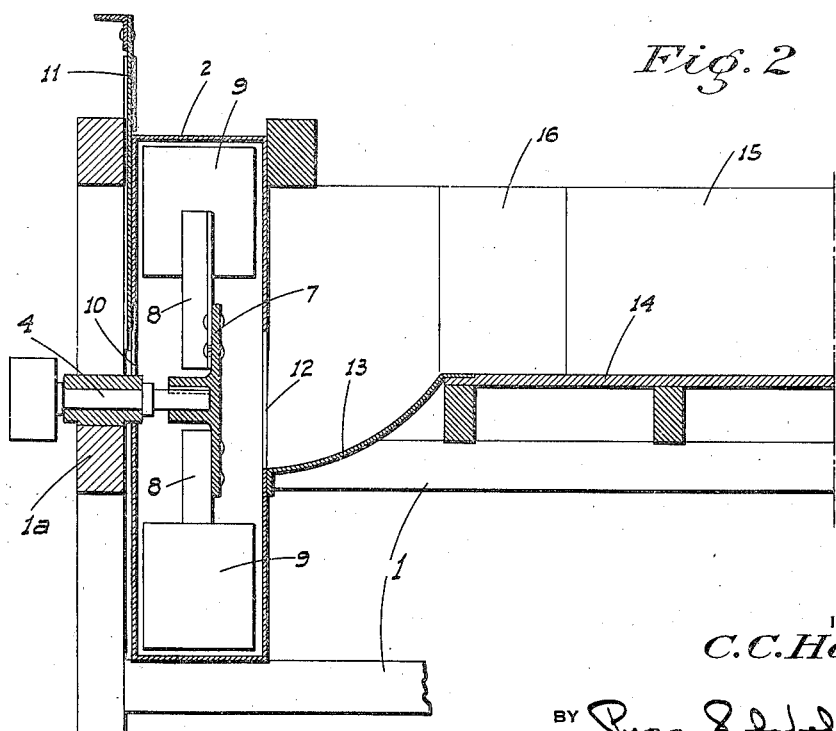
Figure 2 is an enlarged fragmentary longitudinal section of the same.
Figure 3:
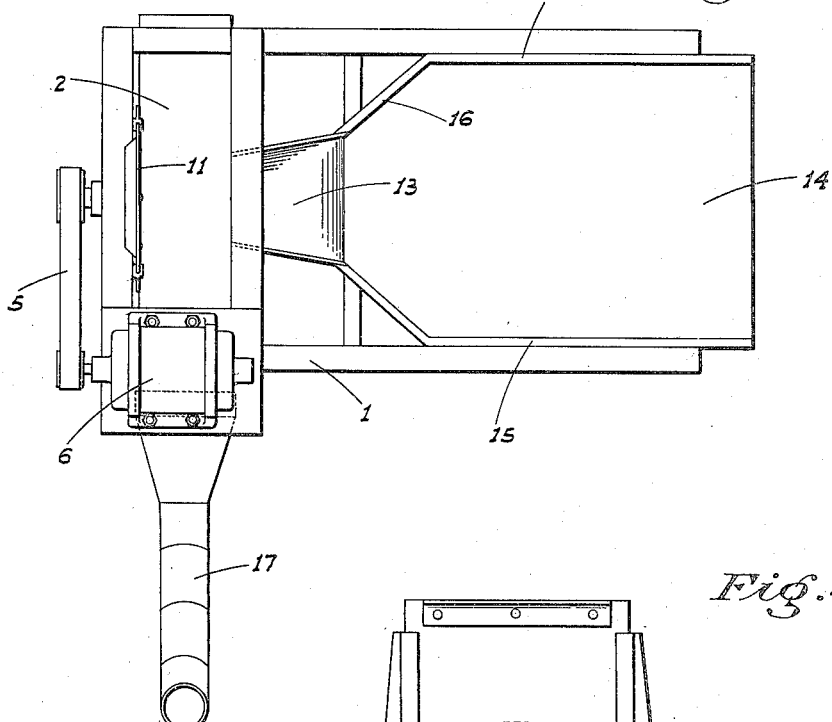
Figure 3 is a top plan of the structure.
Figure 4:
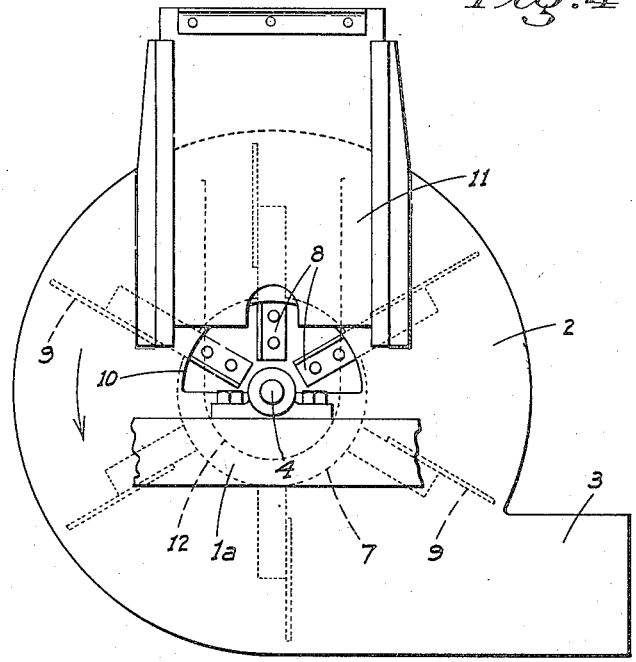
Figure 4 is an end view of the blower unit, detached.

A drive shaft 4 projects into the housing from one end thereof and is suitably supported from a cross member 1a of the frame at one end of the housing as shown in Fig. 2. The shaft is driven at a suitable speed by means of a belt drive connection 5 with an electric motor 6 mounted on the frame structure above the housing and to one side of the same.

Inside the housing but spaced from the opposite side thereof, the drive shaft carries a disc 7 on which is mounted a plurality of radially projecting arms 8. These arms at their outer end support paddles 9 disposed substantially radial with the shaft.

At said one end, the housing is formed with an air intake opening 10 extending upwardly from the shaft; the effective size of said opening being controlled by a vertically adjustable slide shutter 11 mounted above the opening.

The other end of the housing is formed with a preferably circular material intake opening 12; a hopper or chute 13 leading downwardly toward said opening with its lower portion curved and alined with the lower half of said opening. The hopper leads from the adjacent end of a relatively large flat platform 14 mounted on the frame structure, and enclosed along the sides by upstanding side members 15, the portions of which adjacent the chute converge the same as shown at 16. The platform extends to the corresponding end of the frame and is exposed or open at said end for the reception of a bale thereon. The platform is disposed at such a height that an operator standing on the ground may conveniently manipulate the baled material.

In operation, a bale of bark in an unbroken condition is first placed on the platform. The bale is then stripped of its bindings and allowed to fall apart, being, if necessary, forcibly disintegrated into relatively small portions. Such portions are then pushed ahead until they slide down the chute and into the blower housing, in which the blower unit is of course already rotating. As the light bark enters the housing, the rapidly rotating paddles, aided by the suctional force set up by such rotation, causes the bark to be thrown upwardly and about the housing and thus thoroughly separated and fluffed before being discharged through passage 3.

A sectional flexible conduit unit, one section of which is shown at 17, is of course secured at one end over the outlet 3 while the apparatus is in use, so that the fluffed bark being discharged from the blower may be conveniently conveyed to the point of use and deposited in place in the building without further handling. This suctional effect on the material is aided by the position and size of the central disc 7 of the rotary blower unit relative to opening 12.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

In a separating and blowing apparatus for building insulation material, and which apparatus includes a substantially cylindrical housing including spaced end plates, the housing having an intake opening and a discharge outlet therein, a driven shaft extending axially into the housing through one end plate and terminating short of the other, a rotary paddle unit mounted on said shaft within the housing, and an open topped feed chute leading to said intake opening; the paddle unit including a circular disc mounted concentrically at the end of the shaft in facing relation and relatively close to but spaced from said other end plate, said intake opening being circular and formed in said other end plate concentric to the disc, the diameter of the disc being substantially greater than the diameter of said intake opening, and the space between the disc and said other end plate being unobstructed.

CARL C. HALL.